3,519,445
$Al_2O_3$-$P_2O_5$-$B_2O_3$ GLASS-CERAMIC ARTICLES
AND METHODS
John F. MacDowell and Lois E. Wilson, Painted Post,
N.Y., assignors to Corning Glass Works, Corning, N.Y.,
a corporation of New York
No Drawing. Filed Nov. 6, 1967, Ser. No. 681,004
Int. Cl. C03c 3/22
U.S. Cl. 106—39                                    9 Claims

ABSTRACT OF THE DISCLOSURE

This invention relates to glass-ceramic articles in the $Al_2O_3$-$P_2O_5$ composition field wherein boric oxide ($B_2O_3$) constitutes the nucleating agent or crystallization catalyst and, particularly, to such glass-ceramic articles which are transparent and stable in the presence of alkali metal vapors even at high temperatures, recommending their use as high temperature lamp envelopes.

---

The production of glass-ceramic or semicrystalline ceramic articles, as they have frequently been termed, contemplates the controlled crystallization of glass articles in situ. Thus, a glass-forming batch, to which a nucleating agent or crystallization catalyst is commonly added, is melted, the melt simultaneously cooled to a glass and an article of a desired configuration shaped therefrom, and this glass article is then subjected to a rather rigidly defined heat treating schedule. In general, this heat treatment consists of a nucleation step at temperatures between the annealing and softening points of the glass wherein submicroscopic particles of the nucleating agent or crystallization catalyst are developed. Some nuclei may b eformed in the glass as the melt is being cooled but, generally, the melt is cooled so rapidly in order to avoid devitrification. These nuclei provide sites for the growth of crystals thereon during the crystallization step which normally is carried out at temperatures above those at which the glass article is nucleated. The crystallization produced is relatively uniformly fine-grained, substantially homogeneously dispersed, but randomly oriented, throughout a glassy matrix, and comprises a substantial proportion of the article, i.e., the glass-ceramic article is more than about 50% by weight crystalline. The glassy matrix is composed of the uncrystallized portion of the base glass remaining after the glass article has been crystallized in situ. This uniformly fine-grained crystal structure is opposed to the coarsely-crystallized, distorted, weak, or porous ceramic bodies obtained during the normal devitrification of glass.

Since a glass-ceramic article is more crystalline than glass, the chemical and physical characteristics of the crystals present normally influence the properties of the composite article. Further, because the crystallization occurred in situ, a glass-ceramic product differs from the conventional sintered ceramic body in being free of voids and non-porous. Finally, since a glass-ceramic article is produced from a glass body, the conventional glass-forming methods of fabrication such as blowing, casting, drawing, pressing, rolling, etc. can be employed. Glass-ceramic bodies have been utilized commercially in culinary and dinner ware, electrical resistors and capacitors, and telescope mirrors.

The prior art has demonstrated the utility of various nucleating agents in the manufacture of glass-ceramic articles. Such materials have included the photosensitive metals copper, silver, and gold, such metal oxides as $TiO_2$, $ZrO_2$, $SnO_2$, and $As_2O_3$, and such miscellaneous units as ZnS and the platinum group metals. $TiO_2$ exhibits an almost universal versatility in nucleating glass compositions while the other materials are limited in effectiveness to one or a few glass composition fields at most. The use of $TiO_2$, however, commonly results in a product which is opaque and which cannot be used in applications where heat is applied under reducing conditions, such as in the sealing to molybdenum and tungsten which must be undertaken in a reducing atmosphere.

Heretofore, glass-ceramic articles have been produced from glasses wherein silica constituted the principal network-forming ingredient but we have now discovered that certain non-silicate glass systems wherein $P_2O_5$ acts as the principal network-forming ingredient can be nucleated with $B_2O_3$ to produce very satisfactory glass-ceramic articles. The basic operable field of glasses we have determined to be the $Al_2O_3$-$P_2O_5$ system wherein various modifying oxides may, optionally, be included. Thus, in general, the glasses of this invention consist essentially, in weight percent on the oxide basis, of about 50–80% $P_2O_5$, 10–30% $Al_2O_3$, and 5–20% $B_2O_3$. Although the best transparency and the highest thermal stability were exhibited by glass-ceramic articles in the binary $Al_2O_3$-$P_2O_5$ field, opaque to translucent articles demonstrating properties suitable for applications other than where transparency and refractoriness are required can be obtained by adding modifying oxides to the binary composition. Hence, amounts up to 25% by weight total of CaO, MgO, and ZnO can advantageously be added to alter the physical and electrical properties of the final article. In broad terms, then, our invention comprises compounding a glass-forming batch falling within the above composition system, melting this batch at a temperature and for a time sufficient to insure a homogeneous melt, cooling this melt sufficiently rapidly to obtain an essentially crystal-free glass, and thereafter heat treating the glass in such a manner to first cause the development of nuclei therein and subsequently to cause the growth of crystals on these nuclei.

We have learned that the total amounts of $Al_2O_3$, $P_2O_5$, and $B_2O_3$ ought to constitute at least 75% by weight of the composition in order to insure a fine-grained glass-ceramic article with no incompatible crystal phases being developed to cause weakness in the body and to avoid any deleterious effect upon the nucleating efficiency of the $B_2O_3$. Other than the modifying oxides, various compatible metal oxides such as $Li_2O$, $Na_2O$, SrO, BaO, PbO, $SnO_2$, and CdO may be included in the composition in amounts totalling 10% by weight, with individual amounts normally being less than 5% by weight. The addition of $K_2O$ appears to inhibit crystallization and, therefore, is preferably absent.

Table I sets forth examples of glasses having compositions encompassed within the aforementioned range, calculated from their respective batches in weight percent on the oxide basis, exclusive of minor impurities which may be present in the batch materials. It will be appreciated that the batch ingredients for these glasses can comprise any materials, either oxides or other compounds, which, on being melted together, are converted to the desired oxide compositions in the proper proportions. The batches were thoroughly blended together and melted in open silica crucibles at 1500°–1650° C. for 1–2 hours. The melts were very fluid so no fining agent such as $As_2O_3$ or $Sb_2O_3$ was deemed necessary. The melts were poured into steel molds, placed into an annealer operating at 450°–650° C., and cooled as a glass to room temperature. The glass shapes were then placed in an electric furnace, heated to the nucleation range (about 500°–700° C.) for a sufficient length of time to insure substantial development of nuclei, and thereafter heated to the crystallization range (about 650°–1050° C.) for a sufficient length of time to secure a good growth of crystals on the nuclei, i.e., to cause a major proportion of the glass to crystallize.

In general, these glasses nucleate quite rapidly and a period of time of about ¼–2 hours within the nucleation range is ample to obtain satisfactory nucleation with 1 hour being utilized. Much longer nucleation times can be employed successfully and some crystallization will occur at these temperatures after long dwell periods but such practice is not commercially economical and the nucleated article is usually heated to a higher temperature to cause crystal growth.

At temperatures within the crystallization range, the growth of crystals is very rapid with about ½–4 hours yielding highly crystalline products. As is the case with all time-temperature dependent reactions, the rate of crystal growth is greater at the higher extreme of the temperature range. Here, again, much longer dwell periods, 24 hours and longer, within the crystallization range can be employed with no adverse effect upon the crystallized product, but there is no advantage in so doing.

TABLE I

| Percent: | 1 | 2 | 3 | 4 | 5 | 6 | 7 | 8 |
|---|---|---|---|---|---|---|---|---|
| $P_2O_5$ | 66.9 | 64.8 | 68.6 | 67.1 | 66.0 | 68.3 | 70.6 | 76.0 |
| $Al_2O_3$ | 24.0 | 18.5 | 16.5 | 16.2 | 15.9 | 15.0 | 12.7 | 10.9 |
| $B_2O_3$ | 9.1 | 16.7 | 14.9 | 16.7 | 18.1 | 16.7 | 16.7 | 13.1 |

| Percent: | 9 | 10 | 11 | 12 | 13 |
|---|---|---|---|---|---|
| $P_2O_5$ | 68.9 | 67.5 | 66.3 | 65.0 | 67.2 |
| $Al_2O_3$ | 16.7 | 16.3 | 15.8 | 11.6 | 12.0 |
| $B_2O_3$ | 5.4 | 7.4 | 9.1 | 16.7 | 7.4 |
| CaO | 9.0 | 8.8 | 8.8 | 6.7 | 13.4 |

| Percent: | 14 | 15 | 16 | 17 | 18 |
|---|---|---|---|---|---|
| $P_2O_5$ | 69.4 | 68.0 | 62.5 | 66.6 | 68.8 |
| $Al_2O_3$ | 16.6 | 16.4 | 15.0 | 11.9 | 19.1 |
| $B_2O_3$ | 7.6 | 9.1 | 16.7 | 16.7 | 9.1 |
| MgO | 6.4 | 6.5 | 5.8 | 4.7 | 3.0 |

| Percent: | 19 | 20 | 21 | 22 | 23 | 24 |
|---|---|---|---|---|---|---|
| $P_2O_5$ | 64.8 | 63.6 | 63.0 | 66.6 | 55.8 | 62.0 |
| $Al_2O_3$ | 15.4 | 15.1 | 11.3 | 18.5 | 10.2 | 14.8 |
| $B_2O_3$ | 7.4 | 9.1 | 16.7 | 9.1 | 16.7 | 9.1 |
| ZnO | 12.4 | 12.1 | 9.0 | 5.8 | 17.3 | 11.8 |
| $Li_2O$ | | | | | | 2.1 |

| Percent: | 25 | 26 | 27 | 28 | 29 | 30 | 31 |
|---|---|---|---|---|---|---|---|
| $P_2O_5$ | 66.1 | 64.7 | 64.7 | 63.0 | 64.6 | 57.6 | 66.0 |
| $Al_2O_3$ | 15.8 | 15.5 | 15.5 | 15.1 | 15.4 | 13.8 | 11.0 |
| $B_2O_3$ | 9.1 | 9.1 | 9.1 | 9.1 | 9.1 | 9.1 | 9.1 |
| CaO | 4.3 | 8.5 | 6.2 | 8.2 | | | 13.0 |
| MgO | | | | | 6.1 | | |
| ZnO | | | | | | 11.0 | |
| $Li_2O$ | 4.6 | 2.2 | | | | | |
| $Na_2O$ | | | 4.5 | 4.5 | 4.7 | 8.5 | |

| Percent: | 32 | 33 | 34 | 35 | 36 | 37 |
|---|---|---|---|---|---|---|
| $P_2O_5$ | 65.7 | 63.0 | 65.7 | 63.0 | 65.7 | 63.0 |
| $Al_2O_3$ | 18.3 | 17.5 | 18.3 | 17.5 | 18.3 | 17.5 |
| $B_2O_3$ | 8.7 | 8.4 | 8.7 | 8.4 | 8.7 | 8.4 |
| MgO | 2.9 | 2.7 | 2.9 | 2.7 | 2.9 | 2.7 |
| SrO | 4.4 | 8.4 | | | | |
| BeO | | | 4.4 | | | |
| BaO | | | | 8.4 | | |
| PbO | | | | | 4.4 | 8.4 |

| Percent: | 38 | 39 | 40 | 41 | 42 | 43 | 44 | 45 |
|---|---|---|---|---|---|---|---|---|
| $P_2O_5$ | 65.7 | 63.7 | 61.0 | 63.7 | 63.7 | 63.7 | 63.7 | 63.7 |
| $Al_2O_3$ | 18.3 | 17.7 | 16.9 | 17.7 | 17.7 | 17.7 | 17.7 | 17.1 |
| $B_2O_3$ | 8.7 | 8.7 | 8.3 | 8.7 | 8.7 | 8.7 | 8.7 | 15.4 |
| MgO | 2.9 | | | | | | | |
| ZnO | | 5.6 | 5.3 | 5.6 | 5.6 | 5.6 | 5.6 | |
| SrO | | 4.4 | 8.3 | | | | | |
| BeO | | | | 4.4 | | | | 7.7 |
| BaO | | | | | 4.4 | | | |
| PbO | | | | | | 4.4 | | |
| CdO | | | | | | | 4.4 | |

TABLE I.—Continued

| | 46 | 47 | 48 |
|---|---|---|---|
| Percent: | | | |
| $P_2O_5$ | 73.0 | 75 | 75.6 |
| $Al_2O_3$ | 17.5 | 18 | 13.6 |
| MgO | | 7 | |
| CaO | 8.5 | | |
| ZnO | | | 10.8 |
| $B_2O_3$ | 8 | 10 | 20 |
| $SnO_2$ | 5 | 5 | 10 |

In the above-cited examples, the glass shapes were heated to the nucleation range and the crystallization range at 5° C./minute. It will be appreciated that slower or faster heat-up schedules may be employed where very thick or very thin shapes, respectively, are involved. The 5° C./minute rate has been found to be satisfactory in most instances in preventing breakage due to thermal shock and excessive deformation of the glass article as it is being heated above its softening point and before crystallization has progressed to a sufficient extent to support the body. The crystallization of the glass proceeds more rapidly as the temperature approaches the liquidus of the crystal phase. Hence, in the early stages of crystallization the proportion of glassy matrix is large and the article will readily deform if the temperature thereof is raised too rapidly in the vicinity of the glass softening point. Thus, the rate of temperature rise should preferably balance the rate at which crystals are developing in the glass. From this it can be seen that no holding periods as such need be utilized but, rather, merely a schedule involving a uniformly gradual temperature rise. However, the use of dwell periods at the nucleation and crystallization stages insures the requisite nucleation and subsequent fine-grained crystallization and is the preferred practice of the invention.

The rate of cooling the crystallized body to room temperature is dependent upon its resistance to thermal shock and here, again, the size of the body influences the rate chosen. A 5° C./minute cooling rate has yielded sound products in all the shapes tried by use. Much faster rates have been utilized with small articles with no injury thereto. As a matter of convenience, the crystallized products resulting from the examples of Table I were left in the heat treating furnace after the schedule was completed, the heat to the furnace cut off, and the funrace allowed to cool overnight at its own rate with the articles retained therein. This rate was estimated to average about 3° C./minute.

Finally, where fuel economics and speed of production in obtaining the crystallized product are sought, the glass shapes need not be cooled to room temperature and then reheated. This cooling to room temperature permits the visual observation thereof for glass quality. Rather, the glass melt can be cooled to just below the transformation range, i.e., the temperature at which a liquid melt is deemed to have been transformed into an amorphous solid, and the predetermined heat treatment then commenced. The transformation range is in the general vicinity of the annealing point of the glass which with the glasses of this invention ranges about 450°–650° C.

Our invention, then, comprises three essential steps: (1) melting the proper glassforming batch; (2) simultaneously cooling the melt at least below the transformation range thereof and shaping it into a glass body; and (3) exposing the glass body to temperatures between about 500°–1050° C. to crystallize the body in situ. The preferred treatment consists of a two-step procedure such that it is nucleated within the 500°–700° C. range and then crystallized within the 650°–1050° C. range.

Table II records the heat treating schedules utilized with the various glass articles of the examples recited in Table I. An electric furnace was employed in carrying out the temperature schedules reported therein. Table II also sets out a visual description of the crystallized products along with some measurements of modulus of rupture (p.s.i.), coefficient of thermal expansion ($\times 10^{-7}/°$ C.), and density (g./cc.) determined in accordance with conventional practice.

We claim:
1. A glass-ceramic article comprising fine-grained,

TABLE II

| Example Number | Heat Treating Schedule | Description | Modulus of Rupture | Coef. of Expansion | Density |
|---|---|---|---|---|---|
| 1 | Hold at 750°C. for 1 hr.; hold at 900°C. for 1 hr | Fine grained, transparent | | | |
| 2 | do | do | | | |
| 3 | do | do | | 91.7 | |
| 4 | Hold at 800°C. for 1 hr.; hold at 900°C. for 1 hr | do | | 92.9 | |
| 5 | Hold at 750°C. for 1 hr.; hold at 900°C. for 1 hr | do | | 91.9 | |
| 6 | do | do | | 88.9 | |
| 7 | do | do | | | |
| 8 | do | do | | | |
| 9 | Hold at 750°C. for 1 hr.; hold at 830°C. for 1 hr | do | | | |
| 10 | Hold at 700°C. for 1 hr.; hold at 820°C. for 1 hr | do | 8,030 | 90.9 | 2.521 |
| 11 | Hold at 700°C. for 1 hr.; Hold at 1,000°C. for 1 hr | do | 8,320 | 95.3 | 2.531 |
| 12 | Hold at 650° C. for 1 hr.; hold at 800° C. for 1 hr | Fine-grained, almost transparent | 9,190 | 95.0 | 2.586 |
| 13 | Hold at 750° C. for 1 hr.; hold at 850° C. for 1 hr | Fine-grained translucent | | | |
| 14 | Hold at 650° C. for 1 hr.; hold at 800° C. for 1 hr | Fine-grained, transparent | | | |
| 15 | do | Fine-grained, translucent | 8,770 | 85.8 | 2.466 |
| 16 | Hold at 600° C. for 1 hr.; hold at 700° C. for 1 hr | Fine-grained, opaque | | | |
| 17 | Hold at 650° C. for 1 hr.; hold at 895° C. for 1 hr | Fine-grained, translucent | | 74.9 | |
| 18 | Hold at 660° C. for 1 hr.; hold at 830° C. for 1 hr.; hold at 1,000° C. for 1 hr. | do | | | |
| 19 | Hold at 600° C. for 1 hr.; hold at 750° C. for 1 hr | do | | | |
| 20 | Hold at 645° C. for 1 hr.; hold at 900° C. for ½ hr | do | | | |
| 21 | Hold at 660° C. for 1 hr.; hold at 755° C. for 1 hr | do | | | |
| 22 | Hold at 710° C. for 1 hr.; hold at 825° C. for 1 hr | do | | 73.0 | |
| 23 | Hold at 645° C. for 1 hr.; hold at 800° C. for 1 hr | do | | 87.5 | 2.730 |
| 24 | Hold at 610° C. for 1 hr.; hold at 710° C. for 1 hr | do | | | |
| 25 | Hold at 550° C. for 1 hr.; hold at 650° C. for 1 hr | do | | | |
| 26 | Hold at 610° C. for 1 hr.; hold at 710° C. for 1 hr | do | | 106.4 | 2.506 |
| 27 | Hold at 650° C. for 1 hr.; hold at 710° C. for 1 hr | do | | 152.2 | |
| 28 | Hold at 610° C. for 1 hr.; hold at 710° C. for 1 hr | do | | 146.0 | 2.526 |
| 29 | Hold at 550° C. for 1 hr.; hold at 650° C. for 1 hr | do | | | |
| 30 | Hold at 650° C. for 1 hr.; hold at 700° C. for 1 hr | do | | 185.3 | |
| 31 | Hold at 600° C. for 1 hr.; hold at 710° C. for 1 hr | Fine-grained, opaque | | 97.1 | 2.646 |
| 32 | Hold at 700° C. for 1 hr.; hold at 800° C. for 1 hr | Fine-grained, translucent | | | |
| 33 | do | do | | | |
| 34 | do | do | | | |
| 35 | do | do | | | |
| 36 | do | do | | | |
| 37 | do | do | | | |
| 38 | do | do | | | |
| 39 | do | do | | | |
| 40 | do | do | | | |
| 41 | do | do | | | |
| 42 | do | do | | | |
| 43 | do | do | | | |
| 44 | do | do | | | |
| 45 | do | Fine-grained, opaque | | | |
| 46 | Hold at 660° C. for 1 hr.; hold at 700° C. for 1 hr.; hold at 850° C. for 1 hr. | Very fine-grained, opaque | | | |
| 47 | Hold at 660° C. for 1 hr.; hold at 820° C. for 1 hr | Very fine-grained, translucent | | | |
| 48 | Hold at 740° C. for 1 hr.; hold at 840° C. for 1 hr | Very fine-grained opaque | | | |

Tables I and II illustrate the glass compositions and heat treatments therefor which can be converted to fine-grained glass-ceramic articles. The crystal content of these articles is at least 50% by weight and generally is greater than 70% by weight, this factor depending upon the heat treatment employed and the extent to which components of the batch are adaptable to the formation of crystal phases. The crystals, themselves, are substantially all finer than 30 microns in diameter, are generally finer than 10 microns in diameter, and are randomly oriented in the glassy matrix. X-ray diffraction analyses of crystals have not been able to identify them conclusively since there appears to be no ASTM standard for these crystals. However, three main crystalline phases were observed in these glass-ceramic articles.

These were cristobalite-type phosphate phases, including an aluminophosphate solid solution phase (essentially $AlPO_4$), a borophosphate phase (essentially $BPO_4$), and a stuffed magnesium-, calcium-, or zinc oxide phosphate phase. In several instances, all three phases were observed in the same specimen. It is possible that this third phase represents a partial solid solution between the CaO-, MgO-, or ZnO phosphate and the $AlPO_4$ phase.

The $BPO_4$-cristobalite type phase was always present as a major or minor phase when the level of $B_2O_3$ content approached about 20% and the ratio of $Al_2O_3$ to any modifying oxide was 1:1. Such did not hold true when this ratio was greater than 1.

Example 6 represents the preferred embodiment of the invention. These glass-ceramic articles exhibit good transparency and this transparency is stable at temperatures around 1150° C. These factors of transparency and high refractoriness, coupled with a relatively low coefficient of thermal expansion, have recommended the use of this composition in high temperature lighting applications and in sealing to tungsten and molybdenum.

randomly-oriented crystals dispersed substantially homogeneously in a glassy matrix, said crystals being formed through the in situ thermal crystallization of a glass body consisting essentially, by weight on the oxide base, of about 50–80% $P_2O_5$, 5–20% $B_2O_3$, and 10–30% $Al_2O_3$, said glassy matrix consisting essentially of the uncrystallized portion of the glass remaining after the crystallization of said crystals.

2. A glass-ceramic article according to claim 1 wherein said glass body also contains up to 25% by weight total of at least one metal oxide selected from the group consisting of MgO, CaO, and ZnO.

3. A glass-ceramic article according to claim 1 wherein substantially all of said crystals are finer than 30 microns in diameter.

4. A glass-ceramic article according to claim 1 wherein said crystals comprise at least 50% by weight of said article.

5. A method for making a glass-ceramic article which comprises melting a batch for a glass consisting essentially, by weight on the oxide basis, of about 50–80% $P_2O_5$, 5–20% $B_2O_3$, and 10–30% $Al_2O_3$, simultaneously cooling the melt below the transformation range thereof and shaping a glass article therefrom, heating said glass article to a temperature within the range 500°–1050° C., maintaining said glass article within this temperature range for a sufficient length of time to cause a major portion of the glass article to crystallize, and then cooling the crystallized body to room temperature.

6. A method according to claim 5 wherein said glass also contains up to 25% by weight total of at least one metal oxide selected from the group consisting of MgO, CaO, and ZnO.

7. A method according to claim 5 wherein said glass article is first heated to a temperature within the range 500°–700° C. for a sufficient length of time to cause the development of nuclei therein and, thereafter, the glass article is heated to a temperature within the range 650°–1050° C. for a sufficient length of time to cause a major portion of the glass article to crystallize.

8. A method according to claim 7 wherein the time to cause the development of nuclei is about ¼–2 hours.

9. A method according to claim 7 wherein the time to cause a major portion of the glass article to crystallize is about ½–4 hours.

References Cited

UNITED STATES PATENTS

| | | | |
|---|---|---|---|
| 3,020,238 | 2/1962 | Munakata et al. | 106—39 |
| 3,220,861 | 11/1965 | Parry et al. | 106—47 |
| 3,241,935 | 3/1966 | Stookey | 65—33 |
| 3,342,572 | 9/1967 | MacAvoy | 65—33 |

OTHER REFERENCES

Kreidl & Weyl, "Phosphates in Ceramic Ware; IV Phosphate Glasses," J. Am. Cer. Soc. (1941), vol. 24, No. 11, pp. 372–378.

Rawson—Inorganic Glass-Forming Systems, London (1962), Academic Press, p. 173.

HELEN M. McCARTHY, Primary Examiner

U.S. Cl. X.R.

65—33; 106—47